(12) United States Patent
Jacobsen et al.

(10) Patent No.: US 7,442,365 B1
(45) Date of Patent: Oct. 28, 2008

(54) PROCESS FOR PREPARING MOLECULAR SIEVE BEADS

(75) Inventors: Lance L. Jacobsen, Lake Zurich, IL (US); Brian S. Konrad, Schaumburg, IL (US); David A. Lesch, Hoffman Estates, IL (US); Beckay J. Mezza, Arlington Heights, IL (US); James G. Vassilakis, Naperville, IL (US); Cynthia R. Berinti-Vondrasek, Orland Park, IL (US)

(73) Assignee: UOP LLC, Des Plaines, IL (US)

( * ) Notice: Subject to any disclaimer, the term of this patent is extended or adjusted under 35 U.S.C. 154(b) by 323 days.

(21) Appl. No.: 10/867,200

(22) Filed: Jun. 14, 2004

(51) Int. Cl.
*C01B 39/02* (2006.01)
*C01B 39/54* (2006.01)
*B01J 35/08* (2006.01)
*B01J 29/04* (2006.01)
*B01J 29/06* (2006.01)
*B01J 29/08* (2006.01)

(52) U.S. Cl. .................. 423/700; 423/701; 423/709; 423/716; 423/305; 423/312; 502/8; 502/60; 502/64; 585/752

(58) Field of Classification Search ............ 423/716, 423/412, 700, 701, 709, 305, 312; 502/8, 502/64, 60, 208, 214; 585/752
See application file for complete search history.

(56) References Cited

U.S. PATENT DOCUMENTS

| | | | | |
|---|---|---|---|---|
| 4,075,280 A | * | 2/1978 | Fitton et al. ............. | 423/710 |
| 4,088,605 A | | 5/1978 | Rollmann ............... | 252/455 Z |
| 4,283,583 A | | 8/1981 | Velenyi et al. .............. | 585/467 |
| 4,482,774 A | | 11/1984 | Koetsier ..................... | 585/481 |
| 4,581,341 A | * | 4/1986 | Himpsl ........................ | 502/68 |
| 5,045,295 A | * | 9/1991 | Tannous et al. ............. | 423/716 |
| 5,370,859 A | * | 12/1994 | MacLaine-Cross ......... | 423/709 |
| 5,616,310 A | * | 4/1997 | Edwards et al. ............. | 423/700 |
| 5,895,769 A | | 4/1999 | Lai ............................... | 502/4 |
| 5,935,889 A | | 8/1999 | Murrell et al. ................. | 502/9 |
| 5,958,366 A | * | 9/1999 | Smith et al. ................. | 423/700 |
| 6,013,851 A | | 1/2000 | Verrelst et al. .............. | 585/533 |
| 6,656,447 B1 | * | 12/2003 | Tannous et al. ............. | 423/709 |
| 6,773,694 B1 | * | 8/2004 | Lesch et al. ................. | 423/709 |
| 2003/0050219 A1 | * | 3/2003 | Micco et al. ................. | 510/507 |

OTHER PUBLICATIONS

Cundy et al., "Zeolite synthesis using a semicontinuous reactor, Part 1: Controlled nucleation and growth of ZSM-5 Crystals having well-defined morphologies," Zeolites, 15 (1995) 353-372.*
Cundy et al., "Zeolite synthesis using a semicontinuous reactor, Part 2: Synthesis at high nucleation rates," Zeolites, 15 (1995) 400-407.*

* cited by examiner

*Primary Examiner*—David M Brunsman
(74) *Attorney, Agent, or Firm*—Frank S Molinaro

(57) ABSTRACT

A process for preparing beads of various compositions has been developed. The process involves preparing a reaction mixture of sources of framework elements of a molecular sieve. The reaction mixture can optionally contain molecular sieve seeds. Additional sources of the framework elements are added to give a concentration above the critical supersaturation limit thereby forming beads. Depending on the composition of the reaction mixture and the reaction conditions one can obtain beads which are substantially amorphous, to beads that are substantially crystalline molecular sieve. These beads in turn can be further processed to deposit a molecular sieve layer onto the beads.

42 Claims, No Drawings

PROCESS FOR PREPARING MOLECULAR SIEVE BEADS

FIELD OF THE INVENTION

This invention relates to a process for preparing molecular sieve beads comprising an amorphous component and optionally a crystalline molecular sieve component. The process comprises taking a reaction mixture comprising sources of the framework element(s) of a molecular sieve and optionally molecular sieve particles at reaction conditions and adding to it reactive sources of the framework element(s) at a rate and for a time to form beads.

BACKGROUND OF THE INVENTION

Molecular sieve beads are used in many catalyst and adsorbent applications. However, methods used to produce beads have certain drawbacks. For example when spray-drying is used, a binder needs to be used to afford good strength which in turn dilutes the molecular sieve concentration. Pellet formation techniques also usually employ a binder and further have a minimum size limitation.

There are also a number of references in which catalyst particles are formed by depositing a layer onto an inner core. For example, U.S. Pat. No. 4,283,583 discloses a coated zeolite catalyst consisting of an inert core and an outer coating comprising an active catalytic zeolite material. The catalyst is prepared by wetting the inner core partially drying and then contacting the core with a zeolite powder. U.S. Pat. No. 4,482,774 discloses a composite zeolite having a crystalline silica polymorph as the core material and a modified silica overlayer which has substantially the same crystalline structure. The overlayer is formed by adding preformed particles of the silica core into a crystallization gel at crystallization conditions thereby crystallizing the zeolite onto the core. U.S. Pat. No. 4,088,605 discloses growing a substantially aluminum free shell onto an aluminum containing zeolite. U.S. Pat. No. 5,895,769 discloses depositing a polycrystalline zeolite onto a porous substrate. U.S. Pat. No. 5,935,889 discloses preparing catalyst particles by coating core particles with an atomized slurry containing a coating material. Finally, U.S. Pat. No. 6,013,851 discloses a core zeolite having deposited thereon a surface layer where the surface layer has a higher Si/Al ratio than the core.

Applicants have developed a unique process for preparing molecular sieve beads in which molecular sieve seeds or particles are slurried in a solution containing reactive sources of the framework elements of the molecular sieve. To this slurry there are added sources of the framework elements at a rate and for a time to form a gel and agglomerate the gel and particles into beads. The beads can be isolated and comprise a crystalline molecular sieve component and an amorphous component which is a precursor to a molecular sieve.

SUMMARY OF THE INVENTION

A process for producing a bead composition comprising an amorphous and a crystalline molecular sieve component, the crystalline component having a three dimensional framework and a framework composition represented by an empirical formula of:

$$(El_wAl_xP_ySi_z)O_2 \quad (1)$$

where El, Al, P and Si are framework elements present as tetrahedral oxide units, "w" is the mole fraction of El and has a value from 0 to about 0.5, "x" is the mole fraction of Al and has a value from 0 to about 0.5, y is the mole fraction of P and has a value from 0 to about 0.5, and "z" is the mole fraction of Si and has a value from 0 to about 1, w+x+y+z=1 and "y" and "z" are not simultaneously zero, and the amount of amorphous component varies from 0 to about 100 wt. %, the process comprising providing at reaction conditions a reaction mixture comprising reactive sources of El, Al, P and Si per equation (1), adding to the mixture nutrient(s), to provide framework element(s) of the molecular sieve; carrying out the addition to reach the critical supersaturation concentration of the elements thereby forming beads and continuing to further add nutrient(s) to obtain beads of a desired particle size.

The isolated beads can be further heated to convert at least a portion of the amorphous component to a crystalline molecular sieve component.

Another embodiment of the invention is isolating the beads, slurrying the beads in a reaction mixture and adding to the mixture nutrient(s) at a rate to maintain the nutrient(s) concentration between the saturation limit and critical supersaturation limit to grow a molecular sieve layer on the beads.

Yet another embodiment is the product obtained from any of the processes described above.

A further embodiment of the invention is the use of the molecular sieve beads described above in a hydrocarbon conversion process.

These and other objects and embodiments of this invention will become more apparent after the following detailed description of the invention.

DETAILED DESCRIPTION OF THE INVENTION

One embodiment of the present invention is a process for preparing a bead composition which comprises at least an amorphous component. The amorphous component is a precursor to a molecular sieve. Other components of the beads can be a molecular sieve component and crystalline alumina. The process involves forming a reaction mixture comprising reactive sources of the elements of the molecular sieve component and optionally seeds of the molecular sieve component. The molecular sieve component can be any molecular sieve which has a three dimensional framework and which have crystallographically uniform pores. These sieves are classified as either zeolitic or non-zeolitic molecular sieves. Zeolites are alumino-silicate compositions in which the framework structure is composed of $SiO_2$ and $AlO_2$ tetrahedral oxides. Non-zeolitic molecular sieves are those which contain elements other than aluminum and silicon. Examples include silicoalumino phosphates and aluminophosphate molecular sieves. The zeolitic and non-zeolitic molecular sieves which can be prepared using the process of the present invention have a three dimensional framework structure and a framework composition represented by the general empirical formula:

$$(El_wAl_xP_ySi_z)O_2 \quad (1)$$

where El is an element capable of forming a three-dimensional framework (tetrahedral) oxide unit as described below, and P, Al and Si are also framework elements present as tetrahedral oxide units. The mole fraction of El is represented by "w" and has a value from zero to about 0.5, "x" is the mole fraction of Al and has a value from 0 to about 0.5, "y" is the mole fraction of P and has a value from 0 to about 0.5 and "z" is the mole fraction of Si and has a value from 0 to about 1, w+x+y+z=1 and "y" and "z" are not simultaneously zero.

When "El" comprises two or more elements, "w" represents the mole fraction of said elements ($El_1$, $El_2$, $El_3$, $El_4$ etc.) and "w" equals the sum of "$w_1$", "$w_2$", "$w_3$", "$w_4$", etc. which represents, respectively, the mole fractions of $El_1$, $El_2$, $El_3$, $El_4$ etc. These molecular sieves have been given the acronym ElAPSO and are described in detail in U.S. Pat. No. 4,793,984 which is incorporated in its entirety by reference. The criteria for selecting the El element is also presented in the '984 patent. The El is characterized by at least one of the following criteria:

1) "El" is characterized by an electronic orbital configuration selected from the group consisting of $d^0$, $d^1$, $d^2$, $d^5$, $d^6$, $d^7$, or $d^{10}$ where the small crystal field stabilization energy of the metal ligand "—O—El" favors tetrahedral coordination of element El with $O^{2-}$, as discussed in "Inorganic Chemistry" J. E. Huheey, Harper Row, p. 348 (1978);

2) "El" is characterized as capable of forming stable oxo or hydroxo species in aqueous solutions as evidenced by a first hydrolysis constant, $K_{11}$, greater than $10^{-14}$, as discussed in "The Hydrolysis of Cations", C. F. Baes and R. E. Mesmer, John Wiley & Sons (1976);

3) "El" is selected from the group of elements known to occur in crystal structure types geometrically related to the different silica modifications, quartz, cristobalite or tridymite, as discussed in E. Parthe, "Crystal Chemistry of Tetrahedral Structures", Gordon and Breach, New York, London, pp. 66-68 (1964); and 4) "El" is an element, which in its cation form is classified by Pearson. (J. E. Huheey, "Inorganic Chemistry", Harper & Row, p. 276 (1978) as "hard" or "borderline" acids which interact with the "hard" base $O^{2-}$ to form more stable bonds than the cations classified as "soft" acids. Specific elements include but are not limited to arsenic, beryllium, boron, chromium, cobalt, nickel, gallium, germanium, iron, lithium, magnesium, manganese, titanium, vanadium, tin and zinc.

From the general formula described above, several classes of molecular sieves can be described and prepared. For example, when "w" and "y" are both zero, the molecular sieves are zeolites or zeolitic molecular sieves. In this case formula (1) becomes $$(Al_xSi_{1-x})O_2 \tag{2}$$

where x has a value from 0 to about 0.5. Specific examples of the zeolites include but are not limited to zeolite A, zeolite X, mordenite, silicalite, zeolite beta, zeolite Y, zeolite L, ZSM-12, UZM-4 and UZM-5. UZM-4 and UZM-5 are described in U.S. Pat. No. 6,419,895 B1 and U.S. Pat. No. 6,613,302 B1 respectively which are incorporated in their entirety by reference. When x is zero, the zeolite is silicalite. In the case where "x" in formula (1) is greater than zero one obtains formula (3)

$$(El_wAl_xP_ySi_z)O_2 \tag{3}$$

where "w", "y" and "z" are defined as in formula (1) and x' has a value from greater than 0 to about 0.5. Further, when "w" and "z" are zero in formula (3) or when "w" and "z" are zero and "x" is greater than 0 in formula (1), one obtains the ALPO family of non-zeolitic molecular sieves which are described in detail in U.S. Pat. No. 4,310,440 and U.S. Pat. No. 4,500,651, both of which are incorporated in their entirety by reference. Further, when "w" is zero and "z" is greater than zero in formula (1) or (3) (and "x" is greater than zero in formula (1)) then one obtains the SAPO family of non-zeolitic molecular sieves non-limiting examples of which are SAPO-34 and SAPO-11 which are described in U.S. Pat. No. 4,440,871 which is incorporated in its entirety by reference. When "z" is zero and all other subscripts in either formula (1) or (3) are greater than zero, one has the ElAPO family of non-zeolitic molecular sieves. Finally, when all subscripts in formula (1) or (3) are greater than zero, one has the ElAPSO family of non-zeolitic molecular sieves described above, one example of which is MAPSO-31.

The molecular sieve seeds, which are an optional component, are prepared by means known in the art and basically involves preparing a reaction mixture containing reactive sources of El, Al, Si and P along with one or more templating/structure directing agent and water and reacting it at a temperature and for time, usually under autogenous pressure, to crystallize the molecular sieve. Templating agents which can be used are well known in the art and include but are not limited to alkali metals, alkaline earth metals and organic compounds. The organic compounds are any of those well known in the art and include but are not limited to amines such as piperidine, tripropylamine, dipropylamine, diethanolamine, triethanolamine, cyclohexylamine and quaternary ammonium compounds such as the halide or hydroxide compound of tetramethylammonium, tetrabutyl ammonium, tetraethylammonium, tetrapropylammonium, ethyltrimethylammonium, diethyldimethylammonium, etc. As is well known in the art sources of aluminum include without limitation aluminum alkoxide, pseudoboehmite, gibbsite, colloidal alumina, alumina sol, sodium aluminate, aluminum trichloride and aluminum chlorohydrate. Of the above, preferred aluminum sources are pseudoboehmite, sodium aluminate and aluminum alkoxides such as aluminum isoproxide. Silicon sources include without limitation silica sol, colloidal silica, fumed silica, silica gel, silicon alkoxides, silicic acid and alkali metal silicate such as sodium silicate. Phosphorus sources include without limitation phosphoric acid and organic phosphates such as triethylphosphate.

The sources of the element(s) "El" can be any form which permits the formation in situ of a reactive form of the element, i.e., reactive to form a framework oxide unit of element "El". Compounds of element(s) "El" which may be employed include oxides, hydroxides, alkoxides, nitrates, sulfates, halides, carboxylates, and mixtures thereof. Representative compounds which may be employed include without limitation: carboxylates of arsenic and beryllium; cobalt chloride hexahydrate, alpha cobaltous iodide; cobaltous sulfate; cobalt acetate; cobaltous bromide; cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; zinc acetate; tin chloride; and the like.

The resultant reaction mixture is now reacted at a temperature of about 70 to about 200° C. and a time of about 1 hour to about 144 hours usually under autogenous pressure thereby crystallizing the desired molecular sieve. The molecular sieve particles are isolated by conventional techniques such as filtration, centrifugation, etc. and dried to give a powder. This molecular sieve powder can now be used as seeds or particles which are optional components in preparing a reaction mixture for carrying out the process of the invention.

First looking at the embodiment where no seeds are added, the reaction mixture will comprise reactive sources of El, Al, P and Si corresponding to equation (1). The reaction mixture will also optionally contain sources of the templating agent and acid or base in order to adjust the pH to the desired range.

To the resultant slurry or reaction mixture there are now added sources of the desired framework element(s), hereinafter referred to as nutrient(s). Thus the nutrient or combination of nutrients which are added are any of those which can form a molecular sieve. These combinations include without limitation: 1) silicon source; 2) aluminum and silicon sources; 3) aluminum, phosphorus and silicon sources; 4) aluminum and phosphorus sources; 5) El and silicon sources; 6) El, aluminum and phosphorus sources; and 7) El, aluminum, silicon and phosphorus sources. It should also be pointed out that additional templating agent/structure directing agent may need to be added. This can be done by adding the desired source of the agent with one of the nutrients or as a separate stream. Additionally the initial reaction mixture can contain an excess of the desired templating agent.

Regardless of the choice of nutrients, they can be added by any convenient means. These means include preparing solutions of the nutrients, preparing solid suspensions or slurries, adding solids directly and adding neat nutrients. Of course one nutrient can be added by one method, while other nutrient(s) can be added by another method. Additionally, depending on the particular nutrient additional acid or base may need to be added to arrive at the desired pH. For example when sodium silicate is used as the nutrient or source of silicon, acid may need to be added to neutralize the sodium hydroxide which may be generated.

When more than one nutrient is added, e.g. Si and Al, they can be added simultaneously or sequentially. By using sequential addition, one need use only one pump in the case of liquids or slurries. Simultaneous addition can be carried out in one of two ways. First, each nutrient is fed into the reactor containing the reaction mixture using individual ports or injectors. Second, the individual nutrients can be fed into a holding tank, mixed and then fed as one stream into the reactor containing the seed slurry. The latter method is preferred. Finally, the nutrients can be added continuously or intermittently. If intermittently, the addition can be at regular intervals or at irregular intervals.

The addition is carried out at a temperature from ambient temperature to about 80° C. At temperatures of ambient to about 80° C., (and preferably at ambient temperatures) it is preferred to carry out the addition continuously until the nutrient(s) concentration is above the critical supersaturation concentration at which point beads are formed. Addition can be continued until beads with a desired particle size are obtained. If no seeds are added and the addition is carried out below the crystallization temperature of the molecular sieves and preferably at ambient temperature, then the beads will be substantially 100% amorphous. These beads will be referred to as first bead compositions. As stated the initial reaction mixture can also contain molecular sieve seeds having the same composition which would result from the reactive sources in the mixture. In this case, the beads produced at the end of the addition process would have a mixture of amorphous component and crystalline molecular sieve component. The amount of seed material present at the start of the process can vary widely from about 0.1 to about 20 wt. % of the reaction mixture. Seeds can also be optionally added periodically during the addition of nutrient(s) to obtain larger beads and control the particle size distribution. These beads will be referred to as second bead compositions.

The reaction mixture, either with or without seeds, can also be heated to a reaction temperature which is at or above the crystallization temperature of the desired molecular sieve. This temperature is generally from about 70 to about 200° C. Under these conditions, it is preferred to pulse the addition of the nutrient(s) until their concentrations go above the critical supersaturation limit. At this point crystallization begins and beads are formed. Again seeds can be periodically added during the process in order to grow larger beads and/or control bead size. Further, after the nutrient(s) addition is complete, the mixture can be maintained at the reaction temperate for a time of about 1 hour to about 144 hours to further crystallize the molecular sieve component. It has also been found that when aluminum is one of the framework elements, the beads formed at or above the crystallization temperature will also contain crystalline alumina in an amount from about 0 to about 60 wt. % of the beads. These beads will be referred to as third bead compositions.

The first or second bead compositions can be further processed by taking the ending reaction mixture and heating it up to the crystallization temperature and holding the mixture there to crystallize at least a portion of the amorphous component. The temperature will vary from about 70° C. to about 200° C. and the time will vary from about 1 hour to about 144 hours.

Regardless of how the beads are prepared, they can have a composition which can vary from about 100% amorphous to about 100% crystalline molecular sieve component. Thus, the amorphous content can be from 0% to about 100 wt. %, preferably from about 0 to about 50 wt. %, depending on the application, and most preferably from about 0 to about 20 wt. %. The crystalline molecular sieve component can likewise be present from 0 wt. % to about 100 wt. %, but preferably from about 50 to about 100 wt. % and most preferably from about 80 to about 100 wt. %. If crystalline alumina is also present, then it is present in an amount from greater than 0 to about 60 wt %, but usually from about 5 to about 15 wt %. Regardless of how the beads are prepared, it is desirable to carry out the process in order to obtain beads with an average particle size of about 10 to about 800 microns preferably from about 20 to about 300 microns and most preferably from about 30 to about 200 microns. Particle size is determined by conventional techniques.

The first, second and third bead compositions can be used for example, as supports for catalytic metals, as catalysts and as adsorbents, although not all compositions can be used for all applications. However, a preferred use is as cores onto which is deposited one or more layers of molecular sieves or other inorganic oxides. A layer of a particular molecular sieve can be grown or deposited onto the above beads using the basic process described above. That is, a reaction mixture is prepared from the beads, sources of El, Al, P and Si, additional base or acid and templating agent. In one embodiment, the ending reaction mixture can act as the starting reaction mixture of this specific process. Alternatively, the beads can be isolated and then slurried in a mixture comprising the desired sources of elements, templating agents, etc. The layer can comprise the same elements or different elements (at least one) as the core elements. Additionally, the molecular sieve layer can have the same or different structure.

The reaction conditions for this process include a temperature of about 70° C. to about 200° C. and autogenous pressure. Under these conditions the amorphous component (if any) will begin to crystallize. Nutrient(s) are next added either continuously or intermittently. When added continuously, the nutrient(s) concentration is kept below the critical supersaturation but above the saturation concentration. In this regime, the molecular sieve crystals on the outer surface of the beads will begin to grow thereby forming a layer of the molecular sieve. The nutrient(s) addition rate is controlled such that it is essentially the same as the crystal growth rate. The crystal growth rate is determined empirically using analytical techniques such as Scanning Electron Microscopy (SEM).

Another way to control the continuous addition rate is to measure and keep the concentration of each nutrient between the saturation concentration and the critical supersaturation concentration. The continuous addition is carried out for a time until the layer is of the desired thickness. Finally, the continuous addition is carried out as described when the structure of the molecular sieve bead is the same as the layer. However, the two molecular sieves can have different compositions, e.g. SAPO-34 and ALPO-34. In order to accelerate growth of the layer, molecular sieve seed crystals can be added intermittently throughout the process.

It is also an embodiment of the invention to take the reaction mixture which is at the reaction temperature and intermittently add the nutrient(s). This addition is carried out until the concentration of the nutrient(s) is above the critical supersaturation concentration and nucleation occurs thereby forming crystals of a molecular sieve which will agglomerate onto the beads and form a layer over the core. In this case the molecular sieve which crystallizes does not have to have the same structure as the bead molecular sieve. Generally a period of pulsed or intermittent addition is followed by a period of continuous addition as described above in order to grow the molecular sieve crystals which have formed a layer on the beads. During the pulsed and/or continuous addition, molecular sieve seeds can also be added. Usually the addition pulse can last from about 1 second to about 5 minutes with the time between pulses being from about 10 seconds to about 3 hours. Continuous addition is usually carried out for a time from about 1 hour to about 144 hours. The intermittent and continuous additions can be repeated a number of times, but at least two times, provided that the last step is a continuous addition.

In all of the various embodiments described above it is preferred to introduce shear into the reaction mixture in order to control agglomeration and homogeneity of the mixture. Shear can be applied by mechanical means, hydraulic means etc. Specific methods of applying shear include but are not limited to stirrers, impellers, ultrasound, opposed jets, etc. The amount of shear is controlled such that excessive agglomeration does not occur but in the case of forming a layer the shear is not so great as to break away the layer from the beads.

The layered molecular sieve beads or fourth bead composition have uses in various processes including but not limited to adsorption, catalyst or catalyst supports in hydrocarbon conversion processes. Hydrocarbon conversion processes are well known in the art and include ring-opening, cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. No. 4,310,440 and U.S. Pat. No. 4,440,871 which are incorporated by reference.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa), preferably between 200 and 3000 psig (1379-20,685 kPa). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out using feedstocks such as gas oils, heavy naphthas, deasphalted crude oil residua, etc. with gasoline being the principal desired product. Temperature conditions of 850° to 1100° F. (454 to 593° C.), LHSV values of 0.5 to 10 $hr^{-1}$ and pressure conditions from about 0 to about 50 psig (0 to 345 kPa) are suitable.

Alkylation of aromatics usually involves reacting an aromatic, especially benzene, with a monoolefin ($C_2$ to $C_{12}$) to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1379 kPa to 6895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 to about 120 $hr^{-1}$. Details on paraffin alkylation may be found in U.S. Pat. No. 5,157,196 and U.S. Pat. No. 5,157,197, which are incorporated by reference.

Other reactions may be catalyzed by these layered compositions, including base-catalyzed side chain alkylation of alkylaromatics, aldol-condensations, olefin double bond isomerization and isomerization of acetylenes, alcohol dehydrogenation, and olefin dimerization, oligomerization and conversion of alcohol to olefins. Suitably ion exchanged forms of these materials can catalyze the reduction of $NO_x$ to $N_2$ in automotive and industrial exhaust streams. Some of the reaction conditions and types of feeds that can be used in these processes are set forth in U.S. Pat. No. 5,015,796 and in H. Pines, The Chemistry of Catalytic Hydrocarbon Conversions, Academic Press (1981) pp. 123-154 and references contained therein, which are incorporated by reference.

An especially preferred bead composition is a fourth bead composition in which the bead core contains zeolite Y prepared with or without seeds and the layer is also zeolite Y. These zeolite Y bead compositions are particularly useful in cracking or hydrocracking and particularly fluidized catalytic cracking (FCC). FCC units and processes are well known in the art and are carried out under the catalytic cracking conditions set forth above. Additionally, the catalyst is a moving bed of catalyst particles. Examples of patents which describe FCC include U.S. Pat. No. 3,838,036 and U.S. Pat. No. 4,064,038 which are incorporated by reference in their entirety.

The following examples are set forth to illustrate the invention. It is to be understood that the examples are only by way of illustration and are not intended as an undue limitation on the broad scope of the invention as set forth in the appended claims.

EXAMPLE 1

To a 5 L vessel there were added 220 g of zeolite Y (Si/Al$_2$=5 and an average particle size of 1.0 µm) seeds and 1541 g of a recycled mother liquor solution with a composition of (12.4 wt % Si, 0.21 wt % Al and 9.0 wt % Na in H$_2$O) and the mixture heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 62 | 15 | 4750 | 975 |
| 64 | 15 | 4750 | 975 |
| 66 | 15 | 4750 | 975 |
| 68 | 15 | 4750 | 975 |
| 70 | 15 | 4750 | 975 |
| 72 | 15 | 4750 | 975 |
| 74 | 15 | 4750 | 975 |
| 76 | 15 | 4750 | 975 |
| 78 | 15 | 4750 | 975 |

At the end of the pulsed addition sequence a continuous addition of nutrients was carried out using 1224.1 mL of the same sodium silicate and 251.3 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 µm. The yield was 244.5 g of sized beads. The beads were ammonium ion exchanged 3 times at 75° C. with 10% ammonium nitrate solution. The exchanged beads were steamed at 600° C. for 2 hrs in 50% steam then re-exchanged. X-ray diffraction analysis showed the product to be 24.5% Y zeolite with gibbsite crystalline impurities. Finally, chemical analysis of the sized product showed the Si/Al$_2$ ratio to be 0.37.

EXAMPLE 2

To a 5 L vessel there were added 220 g of zeolite Y (Si/Al$_2$=5 and an average particle size of 1.0 µm) seeds and 1541 g of a recycled mother liquor solution with a composition of (12.4 wt % Si, 0.21 wt % Al and 9.0 wt % Na in H$_2$O) and the mixture heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 62 | 15 | 4750 | 650 |
| 64 | 15 | 4750 | 650 |
| 66 | 15 | 4750 | 650 |
| 68 | 15 | 4750 | 650 |
| 70 | 15 | 4750 | 650 |
| 72 | 15 | 4750 | 650 |
| 74 | 15 | 4750 | 650 |
| 76 | 15 | 4750 | 650 |
| 78 | 15 | 4750 | 650 |

At the end of the pulsed addition sequence a continuous addition of nutrients was carried out using 1224.1 mL of the same sodium silicate and 167.6 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 µm. The yield was 150.5 g of sized beads.

To a 2 L vessel there were added 70 g of the zeolite Y seeds, 416.2 g of a recycled mother liquor solution with an analysis of (4.76 wt % Si, 0.06 wt % Al & 3.72 wt % Na in H$_2$O) and 80 g of the sized beads, the mixture was heated to 95° C. with stirring. Aqueous solutions of sodium silicate (29 wt. % SiO$_2$ and 9 wt. % Na$_2$O), sodium aluminate (24 wt. % Al$_2$O$_3$ and 20 wt. % Na$_2$O) and dilute Ludox™ AS40 (23.8 wt % % SiO$_2$) were added to the vessel at increasing rates as shown in the following table.

| Time (hr) | Sodium Silicate feed rate (mL/hr) | Aluminate feed rate (mL/hr) | Ludox ™ AS40 feed rate (mL/hr) |
|---|---|---|---|
| 0 | 13.9 | 7.5 | 24.1 |
| 1.25 | 16.6 | 9.0 | 29.0 |
| 2.5 | 19.6 | 10.6 | 34.2 |
| 3.75 | 22.9 | 12.4 | 39.9 |
| 5.0 | 26.4 | 14.3 | 46.0 |

After the nutrient addition, the product was filtered, washed and then dried at room temperature. The mother liquor was retained for recycle. The solids were washed, screened and elutriated to retain the beads that were between 20 and 150 µm. The yield was 130.5 g of sized beads.

80 g of the sized beads were added back to the reactor with 70 g of zeolite Y seeds and 416.4 g of recycled mother liquor and the same procedure was repeated. This procedure was then repeated again resulting in 3 coatings on the initial beads. The final yield was 94.5 g of sized beads. The beads were ammonium ion exchanged in an elutriation column with 3.5 L of 10% ammonium nitrate solution at 75° C. The exchanged beads were steamed at 600° C. for 2 hrs in 50% steam then re-exchanged. X-ray diffraction analysis showed the product to be 38.7% Y zeolite with small amounts of gibbsite crystalline impurities. Finally, chemical analysis of the sized product showed the Si/Al$_2$ ratio to be 2.7.

EXAMPLE 3

To a 250 mL beaker there were added 1.0 g of a zeolite Y (Si/Al$_2$=5) powder and 50.0 g of a 2.0 wt. % NaOH aqueous solution. The contents of the beaker were stirred while continuously adding sodium aluminate, sodium silicate, and deionized water at 10 mL/hr, 30 mL/hr and 180 mL/hr respectively. After 50 minutes another 0.5 g of the zeolite Y powder was added to promote further agglomeration. After an additional 2 hours, the feeds were shut off, and the solids were filtered from the mother liquor to give 42 grams of beads, which were found to have a molecular sieve component and an amorphous component. The mean particle diameter was typically about 50 microns, with a particle size distribution from 1 to 150 microns.

EXAMPLE 4

To a 2 L vessel there were added 80 g of alpha alumina cores with an average particle size of about 70 µm (Versal™

900), 88 g of zeolite Y seeds (Si/Al$_2$=5 and an average particle size of about 1.0 μm) and 616.4 g of a recycled mother liquor solution with an analysis of (12.4 wt % Si, 0.21 wt % Al and 9.0 wt % Na in H$_2$O) and the mixture heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |

At the end of the pulsed addition sequence a continuous addition of nutrients was carried out using 455.6 mL of the same sodium silicate and 62.3 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 μm. The yield was 70.0 g of sized beads.

To a 2 L vessel there were added 88 g of the zeolite Y seeds, 616.4 g of a recycled mother liquor solution with an analysis of (4.76 wt % Si, 0.06 wt % Al & 3.72 wt % Na in H$_2$O) and 65 g of the sized beads, the mixture was heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added or shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |
| 40 | 15 | 3800 | 520 |
| 41 | 15 | 3800 | 520 |
| 42 | 15 | 3800 | 520 |
| 43 | 15 | 3800 | 520 |

At the end of the pulsed addition sequence a continuous addition of nutrients was carried out using 241.7 mL of the same sodium silicate and 33.1 mL of the same sodium aluminate solutions at a constant rate over 78.5 minutes. After the nutrient addition, the product was filtered, washed and then dried at room temperature. The mother liquor was retained for recycle. The solids were washed, screened and elutriated to retain the beads that were between 20 and 150 μm. The yield was 84.9 g of sized beads.

The above procedure was repeated using 80 g of the sized beads with 88 g zeolite Y seeds and 616.4 g of recycled mother liquor. The yield was 95.1 g of sized beads.

To a reactor there were added 80 g of sized beads from the above paragraph, 88 g of zeolite Y seeds and 616.4 g of recycled mother liquor and the mixture was heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |

At the end of the pulsed addition sequence a continuous addition of nutrients was carried out using 455.6 mL of the same sodium silicate and 62.3 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 μm. The yield was 99.4 g of sized beads.

The beads were ammonium ion exchanged with 10% ammonium nitrate solution at 75° C. The exchanged beads were steamed at 600° C. for 2 hrs in 50% steam then re-exchanged.

What is claimed is:

1. A process for producing a bead composition comprising at least one of an amorphous and a crystalline molecular sieve component, the crystalline component having a three dimensional framework and a framework composition represented by an empirical formula of:

$$(El_wAl_xP_ySi_z)O_2 \tag{1}$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, and the amount of amorphous component varies from 0 to about 100 wt. %, the process comprising providing at reaction conditions a reaction mixture comprising reactive sources of El, Al, P and Si per equation (1), adding to the mixture nutrient(s) per equation (1), to provide framework element(s) of the molecular sieve; carrying out the addition to reach the elements' critical supersaturation concentration thereby forming beads and continuing to further add nutrient(s) to obtain beads of a desired particle size.

2. The process of claim 1 where the reaction mixture further comprises molecular sieve seeds corresponding to the El, Al, P and Si elements in the reaction mixture.

3. The process of claim 1 where the reaction conditions include a temperature from about ambient to about 70° C. and autogenous pressure.

4. The process of claim 3 where the temperature is about ambient.

5. The process of claim 1 where the beads comprise about 100 wt. % amorphous component and the beads and reaction mixture are further heated to a temperature of about 70° C. to about 200° C. for a time sufficient to convert at least a portion of the amorphous component to a crystalline molecular sieve component.

6. The product of the process of claim 5.

7. The process of claim 1 where the beads have an average particle size from about 10 to about 800 μm.

8. The process of claim 1 where the phosphorous source is selected from the group consisting of phosphoric acid, organic phosphates and mixtures thereof.

9. The process of claim 1 where the aluminum source is selected from the group consisting of sodium aluminate, aluminum sulfate, colloidal alumina, alumina sol, pseudoboehmite, aluminum alkoxides and mixtures thereof.

10. The process of claim 1 where the silicon source is selected from the group consisting of sodium silicate, fumed silica, silica gel, silica sol, colloidal silica, silicon alkoxides and mixture thereof.

11. The process of claim 1 where the El source is selected from the group consisting of oxides, hydroxides, alkoxides, nitrates, sulfates, halides, carboxylates and mixtures thereof.

12. The process of claim 1 where the nutrient(s) is/are continuously added.

13. The process of claim 1 where the nutrient(s) is/are intermittently added.

14. The process of claim 1 where the nutrient is a silicon source.

15. The process of claim 1 where the nutrients are selected from the group consisting of 1) an aluminum and a phosphorous source; 2) an aluminum and a silicon source; 3) an aluminum, a silicon and a phosphorous source; 4) an El source and a silicon source; 5) an El source, an aluminum source and a phosphorous source and 6) an El source, an aluminum source, a phosphorous source and a silicon source.

16. The process of claim 15 where the nutrients are simultaneously added.

17. The process of claim 15 where the nutrients are sequentially added.

18. The product of the process of claim 1.

19. A process for preparing a molecular sieve bead comprising a crystalline molecular sieve component having a three dimensional framework and a framework composition represented by an empirical formula of:

$$(El_wAl_xP_ySi_z)O_2 \quad (1)$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, the process comprising providing at reaction conditions a reaction mixture comprising reactive sources of El, Al, P and Si per equation (1) and seed beads where the seed beads comprise at least one of an amorphous component and a crystalline molecular sieve component having a composition per equation (1) and where the amorphous component is present in an amount from 0 to about 100%; adding to the mixture nutrient(s), per equation (1), to provide framework element(s) of the molecular sieve; carrying out the addition at a rate to maintain the nutrient(s) concentration between their saturation limit and their critical supersaturation limit and for a time to grow the beads to a desired size.

20. The process of claim 19 where the reaction conditions include a temperature from about 70° C. to about 200° C. and autogenous pressure.

21. The process of claim 19 where the seed beads comprise about 100 wt. % amorphous component.

22. The process of claim 19 where the phosphorous source is selected from the group consisting of phosphoric acid, organic phosphates and mixtures thereof.

23. The process of claim 19 where the aluminum source is selected from the group consisting of sodium aluminate, aluminum sulfate, colloidal alumina, alumina sol, pseudoboehmite, aluminum alkoxides and mixtures thereof.

24. The process of claim 19 where the silicon source is selected from the group consisting of sodium silicate, fumed silica, silica gel, silica sol, colloidal silica, silicon alkoxides and mixtures thereof.

25. The process of claim 19 where the El source is selected from the group consisting of oxides, hydroxides, alkoxides, nitrates, sulfates, halides, carboxylates and mixtures thereof.

26. The process of claim 19 where the nutrient(s) is/are continuously added.

27. The process of claim 19 where the nutrient(s) is/are intermittently added.

28. The process of claim 19 where the nutrient is a silicon source.

29. The process of claim 19 where the nutrients are selected from the group consisting of 1) an aluminum and a phosphorous source; 2) an aluminum and a silicon source; 3) an aluminum, a silicon and a phosphorous source; 4) an El source and a silicon source; 5) an El source, an aluminum source and a phosphorous source and 6) an El source, an aluminum source, a phosphorous source and a silicon source.

30. The process of claim 29 where the nutrients are simultaneously added.

31. The process of claim 29 where the nutrients are sequentially added.

32. The product of the process of claim 19.

33. A bead composition comprising at least one of an amorphous and a crystalline molecular sieve component, the crystalline component having a three dimensional framework and a framework composition represented by an empirical formula of:

$$(El_wAl_xP_ySi_z)O_2 \quad (1)$$

where El, Al, P and Si are framework elements present as tetrahedral oxide units, "w" is the mole fraction of El and has a value from 0 to about 0.5, "x" is the mole fraction of Al and has a value from 0 to about 0.5, y is the mole fraction of P and has a value from 0 to about 0.5, and "z" is the mole fraction of Si and has a value from 0 to about 1, w+x+y+z=1 and "y" and "z" are not simultaneously zero, the amorphous component is present in an amount from 0 to about 100 wt. % and the beads have an average particle size of about 10 to about 800 microns.

34. The composition of claim 33 where "w" and "y" are both zero.

35. The composition of claim 34 where the crystalline molecular sieve component has the structure of zeolite Y.

36. The composition of claim 33 further comprising an alumina component distributed throughout the beads.

37. The composition of claim 33 further comprising a molecular sieve layer on the bead, the molecular sieve having the same composition and structure as the molecular sieve component in the bead.

38. A hydrocarbon conversion process comprising contacting a hydrocarbon with a catalyst at hydrocarbon conversion conditions to give a converted product, the catalyst comprising a bead composition comprising an amorphous and a crystalline molecular sieve component, the crystalline component having a three dimensional framework and a framework composition represented by an empirical formula of:

$$(El_wAl_xP_ySi_z)O_2 \qquad (1)$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, the molecular sieve component present in an amount from about 15 to about 100 wt. %.

39. The process of claim 38 where the process is cracking.

40. The process of claim 39 where "w" and "y" are both zero and the molecular sieve has the structure of zeolite Y.

41. The process of claim 39 where the conversion conditions include a temperature of about 454° C. to about 593° C., a pressure of about 0 to about 345 kPa (gauge) and an hourly space velocity of about 0.5 to about 10 hr$^{-1}$.

42. The process of claim 38 where "w" and "y" are both zero.

* * * * *